Patented June 15, 1937

2,083,998

UNITED STATES PATENT OFFICE 2,083,998

RUBBER COMPOSITION

George D. Kratz, Scarsdale, and Wharton Jackson, New York, N. Y., assignors to Kaolin Processes Inc., Elizabeth, N. J., a corporation of New Jersey No Drawing. Application December 29, 1933, Serial No. 704,472

4 Claims. (Cl. 106—23)

Our invention relates to a new and improved filler for use in making rubber compounds, a new and improved method of vulcanizing rubber, and a new and improved rubber product.

One of the objects of our invention is to provide a filling material, such as clay, in improved form so that the clay can be uniformly dispersed in a vulcanized rubber compound which consists of rubber, filling material and additional substances which may be desired.

Another object of our invention is to provide a filling material, such as clay or the like, at least part of said filling material having incorporated therewith a peptizing material which is preferably in the form of a solid compound. Said compound is preferably fusible. However, it is decomposed at the vulcanizing temperature, so that the peptizing material is released from the compound.

Another object of our invention is to provide an improved clay filler, said filler having a neutral compound of a peptizing material added thereto or intermixed therewith.

Another object of our invention is to improve the vulcanization of a rubber compound which includes a filler, by adding to said rubber compound a substance which is decomposed during the vulcanization, one of the constituents released by such decomposition having a peptizing effect.

Other objects of our invention will be set forth in the following description and examples, it being understood that the above general statement of the objects of our invention is intended to merely generally explain the same and not to limit it in any manner.

It has been well known for many years to utilize various fillers, in making rubber compounds and zinc oxide, clay, carbon black (known as "channel black" in the rubber industry) have been utilized for this purpose.

It has also been proposed to use strong bases such as sodium hydroxide, potassium hydroxide, sodium carbonate, potassium carbonate, or the like.

However such strongly basic substances, especially when used together with a filler such as zinc oxide, have not reinforced the rubber to any substantial extent, and the resistance to ageing of the rubber compound was seriously impaired.

One of the objections to using finely divided clay as a filler has been the acid nature of ordinary commercial clay, as this acid reaction has tended to retard the rate of vulcanization.

In order to neutralize the acidity of the clay, it has been proposed to intermix the clay with an aqueous solution of sodium hydroxide, soda ash or sodium carbonate. However the use of such strong basic substances impaired the resistance to ageing of the rubber.

According to our invention we incorporate in the rubber compound a substantially neutral substance, which is preferably a compound of the peptizing material. We prefer to do this by incorporating the compound with the clay or other filling material, before the filling material is added to the rubber.

For example the substance known as triethanolamine is a good peptizing agent and it has rather weak basic properties, so that it can be used in making a rubber compound which includes clay. Since this substance is a liquid, it is difficult to disperse the same in the rubber. If this substance is mixed directly with the clay or other filler, said substance tends to lose its activity on standing because the triethanolamine seems to form a carbonate or other reaction product when it is exposed to the air.

According to our invention we form a reaction product between stearic acid and triethanolamine, as this compound has the desirable qualities of the stearic acid and the triethanolamine, since it is decomposed at the temperature of vulcanization.

The stearic acid itself is a desirable constituend of rubber compounds, especially in those rubber compounds in which zinc oxide is present. The stearic acid acts as an equalizer for variable grades of rubber, when it is used alone, or preferably in the presence of zinc oxide.

Since the stearic acid is a very weak acid, it does not injure the vulcanized rubber, especially if zinc oxide is present, since zinc oxide may be classified as a weak base.

In order to form the stearic acid compound, 274 parts by weight of the stearic acid can be melted and heated to a temperature of about 75° C. 134 parts by weight of the triethanolamine are then stirred into the melted stearic acid while the above temperature is maintained.

The ingredients are intimately mixed during the reaction and while the reaction mass is cooling. The triethanolamine is added slowly to the stearic acid, with constant stirring.

The reaction product is solid, and it can be remelted without affecting its activity. Ordinary commercial grades of triethanolamine vary with respect to the percentage of this essential constituent.

For example ordinary commercial grades may contain 75% of triethanolamine, 18% of diethanolamine and 7% of monoethanolamine.

Hence in making the above mentioned material, the ordinary commercial triethanolamine should be standardized by titration with a standard acid solution. For example a mass of 5 gms. of the above mentioned commercial triethanolamine when diluted with 200 cc. of distilled water, and titrated with normal HCl, requires 37.4 cc. of the normal acid in order to neutralize it. Computing this in the usual manner, this is almost the exact equivalent of the same mass of triethanolamine.

We prefer to use the double pressed grade of stearic acid. Since this commercial grade does not have a constant stearic acid content, this should also be checked by dissolving the stearic acid in ethyl alcohol and titrating it with normal NaOH.

Tests have shown that good commercial grades of stearic acid show an equivalent molecular weight of 273.2, as against a theoretical molecular weight of 284.

The triethanolamine and the stearic acid should be caused to react in true molecular proportions, in order to form a substantially neutral compound.

This reaction product can be applied to the clay, while the finely divided clay is in the form of a thin layer, by spraying the molten reaction material upon the surface of the thin layer of clay. For this purpose the reaction material is forced out through fine nozzles or openings, preferably without the use of air or other gas for atomizing the reaction product.

The clay which has been thus treated can be added to the rubber batch in the usual manner.

It is preferable to have the rubber composition include zinc oxide as one of its ingredients, said zinc oxide being present in at least sufficient proportion to decompose the stearic acid compound. However, the invention is not limited to the use of zinc oxide or equivalent material.

We believe that when the rubber composition is vulcanized in the usual manner, the zinc oxide combines with the stearic acid, thus releasing the triethanolamine, which then acts as a peptizing agent. In vulcanizing rubber under heat and pressure, it is well established practice to vulcanize the rubber at a temperature of 230° F. or at higher temperatures. The advantage of using the particular compound or compounds specified herein is that such compounds are sufficiently stable to prevent decomposition until at approximately the vulcanizing temperature, so that the peptizing agent remains in the batch during at least part of the vulcanization, in order to peptize the clay. In order to prevent hydrolysis, the reaction product should be kept dry and the clay to which the reaction product has been applied, should also be kept dry.

Since the reaction product is not altered by exposure to the atmosphere, the clay which has been treated can be kept for a long period of time without injuring the peptizing property of the triethanolamine.

Since the reaction product has been formed by the reaction of a weak acid and a weak base in molecular proportions, it is substantially neutral. When its acidity or alkalinity is tested by ordinary titration methods, it appears to be neutral to both acid and alkaline indicators, insofar as this can be accurately determined.

While we prefer to use a solid, fusible and neutral compound which includes triethanolamine, and which can be decomposed by zinc oxide at a suitable temperature, we do not wish to be limited to this specific substance.

For example we can use other fatty acids, instead of the stearic acid. These fatty acids can be the fatty acids which occur in beeswax and in other waxes. Likewise we can use rosin and other substances which have resin acids as these react with triethanolamine, so as to form neutral compounds which can be decomposed at the vulcanization temperature. The products which are formed by reacting the resins and waxes with triethanolamine, are also solid and fusible.

We can likewise cause the triethanolamine to react with weak acids which are not fatty acids or analogous thereto. For example we can cause the triethanolamine to react with tartaric acid. However we prefer to utilize a compound which contains zinc oxide and stearic acid because the zinc oxide improves the property of the rubber and the zinc oxide also improves the organic accelerators which are commonly used, and the stearic acid is a desirable component of rubber compounds.

Whenever we refer to fatty acids, it is to be understood that we also include the aryl derivatives of said fatty acids such as phenyl acetic acid and the like. Likewise we can cause the triethanolamine to combine with aromatic monobasic acids such as benzoic acid, toluic acid, and homologues.

Likewise we can cause the triethanolamine to combine with certain derivatives of aromatic monobasic acids such as the alkoxybenzoic acids.

As further illustrating the resins which we can utilize, we refer to Burgundy pitch and Venice turpentine.

We can also use the compounds of triethanolamine (or mono or diethanolamine) with gluconic acid.

The zinc salts of these acids are quite soluble in the hot rubber hydrocarbons.

Likewise we do not wish to be limited to the use of triethanolamine as this is merely an example of various amines which can be effectively utilized.

The reaction product between triethanolamine and stearic acid may be added to the clay, in the proportion of 1% by weight, although we do not wish to be limited to said proportion.

Instead of melting this compound, the same can be dissolved in alcohol, or carbon tetrachloride or other solvent which can be readily evaporated, and the solution can be sprayed upon the clay or the clay may be treated with the solution of the reaction product in any suitable manner so that any desired percentage of the clay particles which are to be used as a filler in making a rubber compound, are coated with the reaction product.

Our invention is not dependent upon the action of a soap, or the action of saponaceous material, because, as previously noted, we can secure an effective compound with the use of non-fatty acids, such as tartaric acid and gluconic acid. Likewise the reaction product between triethanolamine and stearic acid is not a true soap. Likewise the reaction compound is decomposed at the vulcanization temperature so that the solid compound merely serves as a convenient vehicle for introducing the triethanolamine into the rubber compound.

Another product which can be used for the purpose of our invention is the reaction product between triethanolamine and dextro-glucono-delta lactone. The dextro-glucono delta lactone is derived from gluconic acid by removing one of the hydroxyl groups to form water with one hydrogen atom from the carboxyl group.

The molecular weight is 194. The combining weight is 184.

Triethanolamine gluconate was made by combining 184 grams of the lactone and 134 grams of triethanolamine. The resultant compound is viscous, reddish brown in color, it has about the consistency of molasses and it is very sticky. It has the characteristic odor of triethanolamine compounds. The heat necessary for the reaction is 250° F. It is therefore possible to produce a reaction product between the triethanolamine and a substance which is not an acid.

We claim:

1. A method of making a vulcanized rubber composition which comprises treating finely divided clay with a substantially neutral and solid compound of an ethanolamine with a higher fatty acid, mixing the thus treated clay with rubber and then heating the resulting mixture to vulcanizing temperature to effect decomposition of said compound and the resultant release in situ of said ethanolamine.

2. A method of making a vulcanized rubber composition which comprises treating finely divided clay with a substantially neutral and solid compound of an ethanolamine with a higher fatty acid, mixing the thus treated clay with rubber and then heating the resulting mixture to vulcanizing temperature to effect decomposition of said compound and the resultant release in situ of said ethanolamine.

3. A method of making a vulcanized rubber composition which comprises treating finely divided clay with a substantially neutral and solid compound of an ethanolamine with a higher fatty acid, mixing the thus treated clay with rubber and a weak base and then heating the resulting mixture to vulcanizing temperature to effect decomposition of said compound and the resultant release in situ of said ethanolamine, said weak base assisting in the decomposition of said compound and effecting a more rapid release in situ of said ethanolamine.

4. A method of making a vulcanized rubber composition which comprises treating finely divided clay with a substantially neutral and solid reaction product of an ethanolamine and stearic acid, mixing the thus treated clay with rubber and zinc oxide and then heating the resulting mixture to vulcanizing temperature to effect decomposition of said reaction product and the resultant release in situ of said ethanolamine, said zinc oxide assisting in the decomposition of said reaction product and effecting a more rapid release in situ of said ethanolamine.

GEORGE D. KRATZ.
WHARTON JACKSON.